United States Patent
Cloutier et al.

(10) Patent No.: US 9,317,824 B2
(45) Date of Patent: Apr. 19, 2016

(54) VENDOR MANAGEMENT SYSTEM AND PROCESS

(75) Inventors: Tracie L. Cloutier, Enfield, CT (US);
Susan B. Gray, Glastonbury, CT (US);
Jeanne T. Peckham, Columbia, SC (US); Donald R. Pierce, Enfield, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 491 days.

(21) Appl. No.: 12/009,190

(22) Filed: Jan. 16, 2008

(65) Prior Publication Data

US 2008/0189296 A1    Aug. 7, 2008

Related U.S. Application Data

(60) Provisional application No. 60/880,937, filed on Jan. 17, 2007.

(51) Int. Cl.
*G06Q 10/00* (2012.01)
*G06Q 10/06* (2012.01)

(52) U.S. Cl.
CPC ........ *G06Q 10/063112* (2013.01); *G06Q 10/06* (2013.01)

(58) Field of Classification Search
CPC ................. G06Q 10/063112; G06Q 10/06
USPC ........................................................ 707/736
See application file for complete search history.

(56) References Cited

U.S. PATENT DOCUMENTS

| | | | |
|---|---|---|---|
| 6,850,900 B1 | 2/2005 | Hare et al. | |
| 6,859,806 B1 * | 2/2005 | Kamarei et al. | |
| 6,871,181 B2 * | 3/2005 | Kansal | 705/4 |
| 7,043,489 B1 | 5/2006 | Kelley | |
| 7,158,944 B1 * | 1/2007 | Settle, III | 705/26.1 |
| 7,197,716 B2 | 3/2007 | Newell et al. | |
| 7,269,584 B2 | 9/2007 | Settle, III | |
| 7,356,491 B2 | 4/2008 | Casile et al. | |
| 7,451,106 B1 | 11/2008 | Gindlesperger | |
| 7,499,871 B1 | 3/2009 | McBrayer et al. | |
| 7,668,863 B2 | 2/2010 | Kalmick et al. | |
| 2001/0041993 A1 * | 11/2001 | Campbell | 705/4 |
| 2002/0038233 A1 * | 3/2002 | Shubov et al. | 705/8 |
| 2002/0133374 A1 * | 9/2002 | Agoni et al. | 705/2 |
| 2003/0233278 A1 * | 12/2003 | Marshall | 705/14 |
| 2004/0019579 A1 * | 1/2004 | Herz et al. | 707/1 |
| 2005/0010438 A1 * | 1/2005 | York et al. | 705/2 |
| 2005/0086179 A1 * | 4/2005 | Mehmet | 705/80 |

(Continued)

OTHER PUBLICATIONS

Microsoft Computer Dictionary fifth Edition. 2002 Microsoft Corporation. p. 193 (3 pages).

(Continued)

*Primary Examiner* — Alexey Shmatov
(74) *Attorney, Agent, or Firm* — Howard IP Law Group, PC

(57) ABSTRACT

Disclosed is a novel vendor management system and method that enables one or more parties to assign various types of files to one or more other parties for review and processing. Multiple business clients are able to refer a variety of files to a select group of vendors having expertise in a particular business or process. Further, the present invention provides a robust and flexible platform to support diverse referrals and workflow needs as well as access to referred files by the vendor, client, and adverse party.

22 Claims, 9 Drawing Sheets

(56) References Cited

U.S. PATENT DOCUMENTS

| | | |
|---|---|---|
| 2005/0182642 A1 | 8/2005 | Pratt |
| 2005/0185225 A1 | 8/2005 | Brawn et al. |
| 2005/0240578 A1 | 10/2005 | Biederman et al. |
| 2006/0173699 A1* | 8/2006 | Boozer ........................... 705/1 |
| 2006/0190490 A1* | 8/2006 | Ritchey et al. ............. 707/104.1 |
| 2007/0088738 A1* | 4/2007 | Barney et al. ................. 707/102 |
| 2007/0185793 A1 | 8/2007 | George |
| 2007/0220086 A1 | 9/2007 | Goldberg et al. |
| 2008/0155684 A1 | 6/2008 | Leventhal |
| 2009/0164338 A1 | 6/2009 | Rothman |

OTHER PUBLICATIONS

Newberry, Jon. "Budgeting boom." ABA Journ 82.(1996): 76-79 (4 pages).

* cited by examiner

VENDOR MANAGEMENT SYSTEM AND PROCESS

CROSS-REFERENCE TO RELATED APPLICATIONS

This application claims priority to application Ser. No. 60/880,937, filed Jan. 17, 2007.

FIELD OF THE INVENTION

The present invention generally relates to the field of vendor management. More specifically, the present invention relates to a system and method for enabling one party to assign various types of files and related information to another party for further processing and handling. Wherein the files are assigned based on a unique and novel vendor bench marking system and method.

BACKGROUND OF THE INVENTION

Typically, when a first party desires to assign a file to a second party, the first party utilizes a manual process. By way of example, an insurance company phones or emails an attorney that it wishes to contract to handle a subrogation litigation. The insurance company then copies or scans the necessary data pertaining to the claim and sends it via a standard delivery method (e.g. regular mail, fax, email, etc).

Copying and/or scanning and sending the necessary data is often time consuming and delays the acceptance of the referral by the proposed vendor. Such a delay is undesirable. For example, in subrogation litigation there is a generally inverse relationship between the amount of time the claim goes uncollected and the successful collection of the payment. That is, the longer a claim goes uncollected, the less likely it is to be successfully collected.

Because each referral must be manually sent to each vendor, this process can often be laborious and require many hours for the client to successfully assign the referral. The client must keep track of the vendor(s) that the files have been sent to as well as physically send the files to each proposed vendor via a standard delivery method.

Furthermore, before the client can send the file out to vendors, it must first find suitable vendors for the file. Again, this can often take considerable time and effort on the client's part. For each proposed vendor, the client must physically send the necessary data. Of course, the more often the client has found vendors for related files in the past, the less amount of time it will likely take to successfully assign related files in the future. Nevertheless, as the assigning process is a manual process, it remains time consuming to repeatedly copy, scan and send the necessary data.

If the first proposed vendor rejects the referral, the client must find another vendor and send the necessary data to that vendor. This process will continue until either a proposed vendor accepts the referral or the client decides to close the file without action (e.g. without payment of a claim). Additionally, for each new referral, this process must be repeated.

Once an appropriate vendor is identified and accepts the referred file, the vendor typically needs to obtain certain additional data. Again, as this data must be copied and/or scanned and sent via a standard delivery method, undesirable further delay results. Upon receipt of the necessary data, the vendor typically utilizes an automated claim processing system. Such automated claim processing systems are well-known in the art, and include both proprietary and open-source platforms.

As the vendor referral process is typically a manual process requiring considerable time and effort for each referral, there is a clear need in the art for an automated vendor management system and method.

SUMMARY OF THE INVENTION

The present invention overcomes the various deficiencies associated with the prior art by creating a novel management system that provides the client with an automated referral process to efficiently assign a selected one or more of a plurality of files or accounts to one of a plurality of vendors that satisfy certain requirements. Importantly, in the present invention the term vendor may refer to any party (i.e. an attorney, expert, a handler or group of handlers, etc,) contacted by the client to handle a file or a plurality of files.

The present invention discloses a system and method to enable multiple clients to refer a variety of files to a select group of vendors having expertise in a particular line of business or process. The present invention preferably provides clients with a network of such vendors that would not normally be available to the clients without a considerable amount of time and research to find such expert vendors.

Furthermore, the present invention provides a robust and flexible platform to support diverse referrals and workflow needs. The present invention may also create a set of standard reports to monitor the vendor management process. The present invention preferably automatically triggers files at a certain point/action in a strategy workflow. The present invention also enables a client to manually trigger files by inserting an action on an account. Triggered files may be automatically allocated across a pool of qualified vendors. The present invention preferably determines frequency of referrals by the client, the file type, or both.

The present invention also provides vendors with the ability to immediately view pertinent information online for referred accounts, to access various documents related to the referral, and to accept, reject, and/or return a referred file. Furthermore, the present invention enables the clients and eligible vendors to communicate regarding a referred file. Preferably, an online platform is provided through which the vendors can submit correspondence regarding the referred, rejected, and/or returned accounts. Some files may require processing by specific vendors (e.g. subrogation claims processed by subrogation specialists, lawsuits processed by attorneys, etc,) in this embodiment the client will identify relevant file parameters necessary for processing by the vendor.

If an online platform is implemented as described above, the system will send the vendor a referral file containing all the necessary files (e.g. claim details, personal information, status, etc.) via the online platform. Larger vendors (e.g. subrogation vendors, large law firms, debt collectors, etc) typically export the necessary files to their internal systems. Smaller vendors (e.g. individual attorneys) typically will not. In the latter scenario, the system of the present invention provides smaller vendors with a report format containing the necessary information to successfully process and handle the referral. Additionally, the adverse party involved in specific claims may be given temporary and limited access to materials pertinent to the given claim, likewise the access may be permanent.

Files may be allocated, for example, based on round robin logic, a percent allocation by file type to each acceptable vendor, data mining, or predictive modeling (e.g. based on such factors as expertise in a given field, prior success rate, time for successful completion, etc).

Alternatively, the client may select a specific vendor to whom the file will be referred. In this scenario, the allocation process is bypassed. Once the file has been allocated to the vendor, the workflow platform is updated with that vendor as the external specialist for the account.

In one embodiment, the present invention may refer related accounts to the same vendor thereby further increasing the efficiency of the referral process. Referring related accounts to the same vendor is advantageous to both the client and the vendor. The vendors who have previously accepted similar referrals may be more likely to accept future related referrals. Also, the vendor gains additional experience with each new referral thus increasing the likelihood of quick and successful performance to complete the necessary tasks related to the referrals. Furthermore, the client may manually override this option and choose a vendor to whom the files should be referred in the future.

After the initial referral is made, the system notifies the vendor and provides the vendor with any changes to the account. For example, if a financial balance of a referred account changes after initial referral (e.g. an additional loss payment is made), the vendor will be notified.

The client may choose to withdraw one or more referral accounts from a particular vendor and reassign them to another eligible vendor, as necessary. The client may manually choose which vendor to reassign the file to from a list of eligible vendors or it may allow the system to automatically reassign the file to another eligible vendor via round robin logic, data mining, predictive modeling, etc. In the former situation, the system will automatically refer future related files to the newly chosen eligible vendor. Further, when the client chooses to reassign the file, it will be given the option to remove a particular vendor from the eligible list of vendors such that no or fewer files are referred to that vendor in the future.

Additionally, the present invention preferably alerts the client if a file has been referred but has not been closed for longer than a predetermined acceptable period of time as determined by the client. Accordingly, if a first placement vendor fails to close the referred file after a certain period, the file may be automatically advanced in strategy and assigned to a second placement vendor.

It is possible that all eligible vendors have reviewed and rejected a referred file. In this case, the referred file is preferably automatically closed. Alternatively, the referred file may be held open for a certain period. The system of the present invention periodically checks to determine whether any new eligible vendors meeting the necessary criteria exist. If such new vendors exist, the file is referred to them for review.

The present invention also provides vendors with the option to submit a recommendation to close a file. The handler then preferably reviews the recommendation manually and determines whether or not to close the file. Furthermore, in an alternative embodiment the review may be automated.

When a vendor accepts a referred file, the system of present invention assigns the appropriate strategy and actions for that particular file type. After a vendor completes work on a file, the vendor has the ability to close the file. In an alternative embodiment the closure of a given file may be exclusively determined by the client without departing from the spirit of the present invention. Closure of the file preferably automatically generates the calculation of a fee for services. The present invention may automatically compile a billing report for a specified period based on these fees.

In one embodiment of the present invention, the client (e.g. automobile insurance provider) may identify a group of files amongst a plurality of files that are likely to have a favorable outcome to the client but require specific processing (e.g. auto insurance claim where the liable party does not have insurance but is considered likely to pay out of pocket) by a specialized vendor (e.g. debt collector, attorney, subrogation specialist, etc). The client may then transfer the selected group of claims to the vendor, whereby the vendor may be required to process and manage claims.

Next, the client may determine which information is relevant to each file (e.g. type of car accident, makes of cars involved, models and years of cars involved, location of car accident, etc.) in order to determine the likely outcome of the file settlement. In one embodiment, the client may score the files based on the aforementioned information relevant to each file in order to determine which files are more likely to be settled with an outcome favorable to the client. In an alternative embodiment, the client may determine arbitrarily which files are likely to be settled with a favorable outcome without departing from the spirit of the present invention.

Next, the client may decide which files are to be pursued aggressively, which are to be pursued less aggressively, and which are to be abandoned. Subsequently, the client may allocate the files according to the vendors which are the most likely to yield a favorable outcome to the client, as determined based on scoring or any other relevant information.

Next, the client may transfer the claim information and all relevant materials to the vendor for processing and handling, the client may determine which vendor is likely to yield the most favorable outcome in a given file, the client may also determine how to distribute the files based on the cost of each vendor. Alternatively, the client may use any or all of the aforementioned factors, as well as any other factors the client deems fit to determine which vendor will handle each file.

Furthermore, a vendor may provide the client with a lower rate on referred files based on any or all of the following factors: the client is a preferred returning client, the client is allocating, a large volume or amount of files, or any other factor the vendor sees fit, without departing from the spirit of the present invention. Additionally, those claims whose outcome is determined to have a high probability of being unfavorable to the client, may be sent to a low cost vendor. In an alternative embodiment, such claims may not be pursued at all.

In the preferred embodiment, the above described steps will be implemented via an integrated online platform. However, the vendor, client, and/or adverse party may choose to send all materials via standard means (e.g. mail, physical delivery, etc.) without departing from the spirit of the present invention.

It will be apparent to those skilled in the art that numerous changes may be made in such details without departing from the spirit and the principles of the invention. It should be appreciated that the present invention is capable of being embodied in various other forms without departing from its essential characteristics.

The present invention may also include a bench marking system and method for vendor management. This aspect of the present invention will preferably determine each vendor's capacity and capability to handle and process specific files.

This may include determining each vendor's performance in a specific account, the vendor's performance within a work type category (e.g. attorney work, debt collection, etc), the vendor's experience assessed by years of experience, the vendor's experience assessed by work done by the vendor to date, the vendor's prior success rate, the vendor's cost, the vendor's time to successful completion, and any other factor which may be deemed useful in assessing the performance of a vendor.

The factors above may generally be used with the scoring system. This is done in order for the client to be able to identify vendors best suited for particular types of work. Alternatively, methods other than scoring a vendor may incorporate the abovementioned factors in order to determine which vendor should be assigned a specific file, without departing from the spirit of the present invention.

It is important to note that, the above listing of factors used to assess vendor performance is present for illustrative purposes, and is not meant to be an exhaustive enumeration of all of the possible factors by which a vendor's performance may be assessed. Any factors which are deemed useful by the client in determining vendor performance may be used in conjunction with the present invention in order to determine the performance of a vendor without departing from the spirit of the present invention.

Accordingly, an object of the present invention is to enable a client to securely and cost effectively assign various file types to certain vendors for further processing and handling.

Another object of the present invention is to provide a customized file referral layout.

Still another object of the present invention is to assign a particular vendor from a pool of vendors through the implementation of client set rules.

Another object of the present invention is to enable a vendor to access certain portions of a referred file/s via an online platform in order to make a determination of whether to accept or reject the referred file/s.

Yet another object of the present invention is to enable the vendor to download files of accepted referrals to its own internal system where the files may be utilized within the vendor's preferred workflow.

Another object of the present invention is to notify the client if the vendor rejects the file.

Still yet another object of the present invention is to reassign rejected files to another vendor.

Still another object of the present invention is to enable the client and vendor to communicate via updates to the referral file.

Yet another object of the present invention is to enable clients to automatically direct files to the appropriate pool of eligible vendors while maintaining control of the referred volume.

Still yet another object of the present invention is to provide a system that manages a plurality of vendors through improved tracking of files and vendor performance.

A further object of the present invention is to provide vendors immediate electronic access to referral data.

Furthermore, an object of the present invention is to provide vendors, and adverse parties with a single point of contact for multiple clients.

Another object of the present invention is to enable vendors to easily accept or reject files at their discretion.

A still further object of the present invention is to enable a client or vendor to process transactions one-by-one, in bulk, or in selected groups.

Other objects, features, and characteristics of the present invention, as well as the methods of operation and functions of the related elements of the structure, and the combination of parts and economies of manufacture, will become more apparent upon consideration of the detailed description below, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

DETAILED DESCRIPTION

Figure 1:
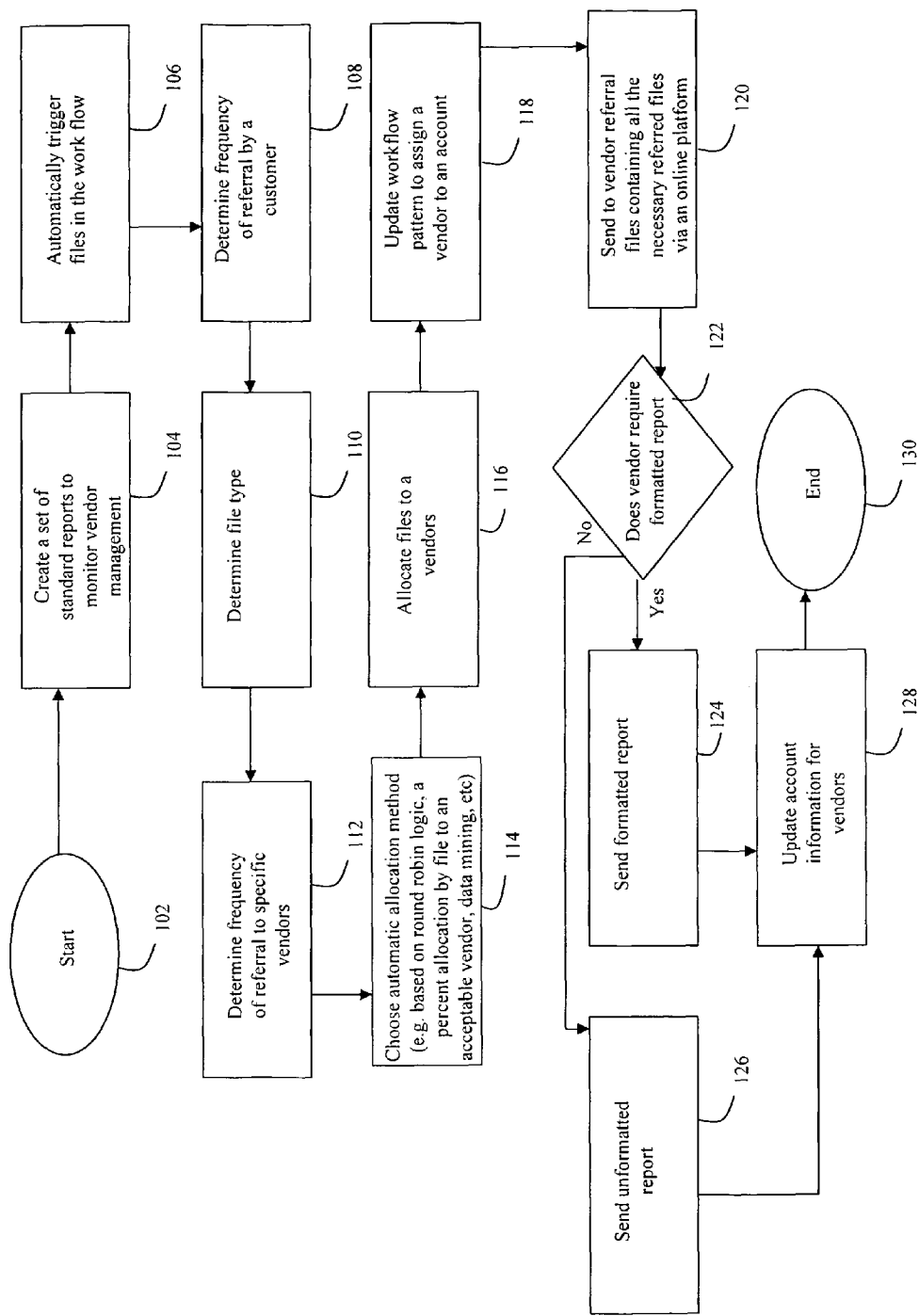
FIG. 1 is a flow chart depicting the steps taken when assigning data to a vendor in accordance with an embodiment of the present invention.

A detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention.

A further understanding of the present invention can be obtained by reference to a preferred embodiment. Although the illustrated embodiment is merely exemplary of systems for carrying out the present invention, both the organization and method of operation of the invention, in general, together with further objectives and advantages thereof, may be more easily understood by reference to the following description. The description is not intended to limit the scope of this invention, but merely to clarify and exemplify the invention.

Moreover, well known methods, procedures, and substances for both carrying out the objectives of the present invention and illustrating the preferred embodiment are incorporated herein but have not been described in detail as not to unnecessarily obscure novel aspects of the present invention.

None of the terms used herein, including "company", "individual", "purchaser", "member", "client", "business client", "consumer", "group", "person", and "corporation" are not meant to limit the scope of the invention to one type of entity, as any entity or individual can also utilize the present invention.

Additionally, the use of the terms "file", "document", "paperwork", "record", and "form" are not meant to limit the scope of the invention to one type of entity. The terms are used interchangeably for convenience. The following presents a detailed description of a preferred embodiment of the present invention.

The present invention provides a vehicle that allows business clients or any other type of clients to refer a variety of types of files. Furthermore, the present invention identifies specific file types and lines of business to be referred to a specific pool of eligible vendors. The present invention applies strategy and actions suitable for the referral type. Importantly, in the present invention the term vendor may refer to any party (i.e. an attorney, expert, a handler or group of handlers, etc,) contacted by the client to handle a file or a plurality of files.

By way of example herein, the handling of certain insurance claims is described in detail. However, one with skill in the art will readily appreciate that the disclosed system and method are not limited to a specific file or work type (e.g. insurance claims). Rather, any type of claim or other account requiring handling by a vendor may be managed by the automated vendor management system and method disclosed herein.

The present invention preferably automatically refers a file to a vendor within a vendor category when a certain action code(s) exists on the file. Some files may require processing by specific vendors (e.g. subrogation claims processed by subrogation specialists, lawsuits processed by attorneys, etc,) in this embodiment the client will identify relevant file parameters necessary for processing by the vendor. The action code(s) is/are preferably specific for each referral type and triggers the file details to be sent to an appropriate vendor category to receive the file type. The triggers may be the last action of a strategy or may be manually inserted on a file to trigger a referral. Examples of triggers include, but are not limited to, second placement collection referral, vendor arbitration, and uninsured motorist vendor management referral (e.g. no response, payment plan, etc).

The allocation process may utilize, for example, a percentage based allocation routine within a pool of eligible vendors based on the type of referral, by the client's preferences, round robin logic, data mining, or predictive modeling (e.g. based on such factors as expertise in a given field, prior success rate, time for successful completion, etc).

For example, arbitration files may be allocated by percentage among all or certain eligible vendors identified as being arbitration vendors, second placement files may be allocated among all or certain eligible second placement collection work vendors, etc.

The client also has the option to allocate a certain percentage of files to certain select vendors. For example, a client may allocate 50% of second placement collection files and 20% of arbitration files to a certain vendor. Once the file has been allocated to a vendor, the system is updated with that vendor being identified as the external specialist for that account.

The present invention further enables manual referral within the automatic process. That is, the client may refer a file to a particular vendor as desired instead of allowing it to go through the automated allocation process. In this example, the automated process is overridden by the manual selection of a particular vendor.

FIG. 1 depicts the steps taken when assigning data to a vendor. The procedure of FIG. 1 starts in step 102, and proceeds to step 104 where first a set of standard reports to monitor vendor management is created, next files are automatically triggered in the workflow in step 106. Subsequently, the frequency of referral by a client is then determined in step 108, next the file type is determined in step 110, and in step 112 the frequency of referral to a specific vendor is determined.

An automatic allocation method is then chosen in step 114, the automatic allocation method may be based on a percent allocation by file to a vendor, or round robin logic. Alternatively, any other automatic allocation method known in the art may be used without departing form the spirit of the present invention. Next, files are allocated to the vendors in step 116, the workflow pattern to assign a vendor to an account is then updated in step 118, and in step 120 referral files containing all the necessary referred files are then sent via an online platform to the vendor.

Each vendor may require a specially formatted report regarding the collection of files allocated to the vendor, thus a determination if a vendor requires a formatted report is carried out next in step 122. If the vendor requires a formatted report, the formatted report is sent in step 124, if the vendor does not require a formatted report step 124 is skipped and an unformatted report is sent to the vendor in step 126. Finally, the account information is updated in step 128 and the procedure ends in step 130.

Figure 2:
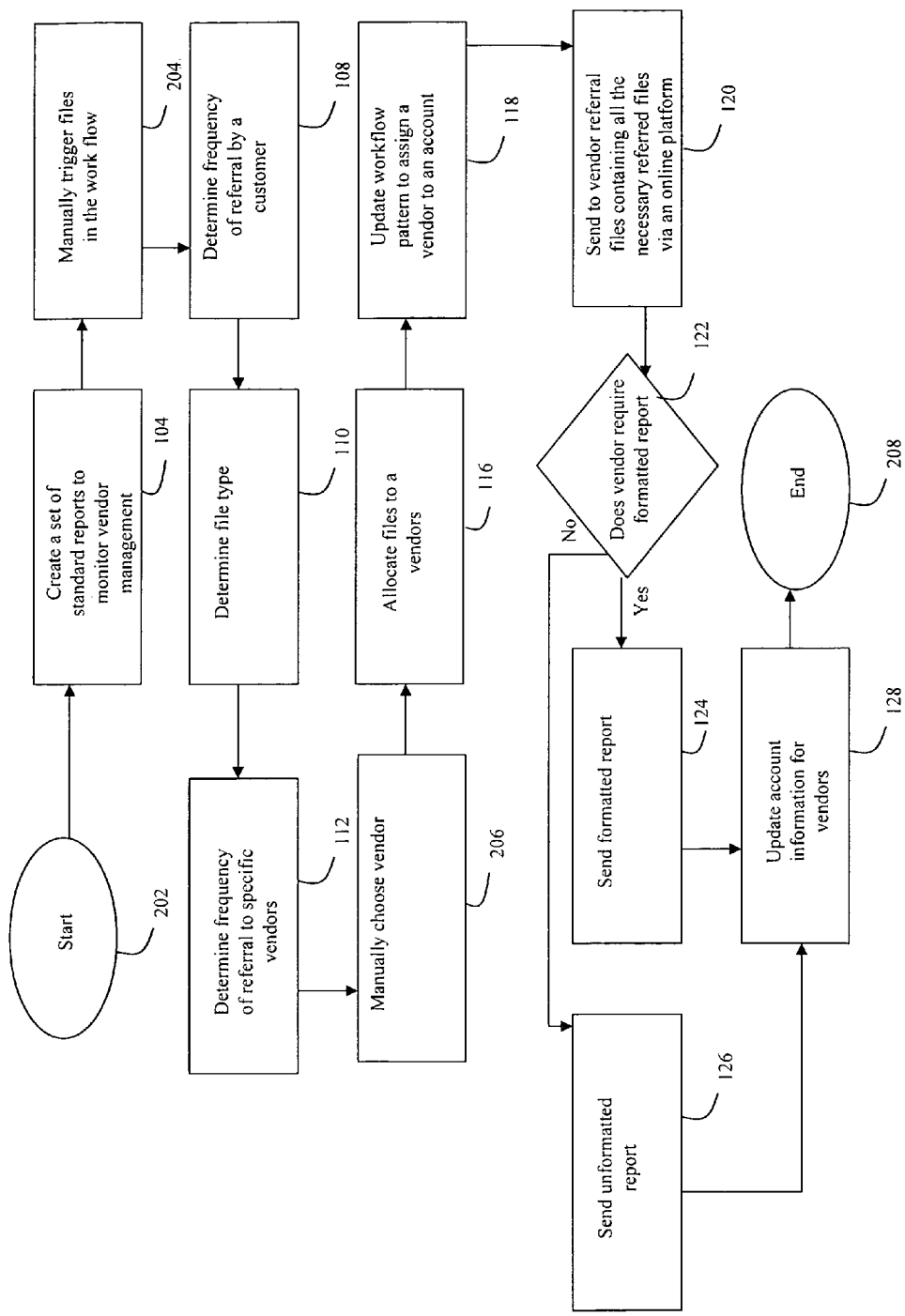
FIG. 2 is a flow chart depicting the steps taken when assigning data to a vendor in accordance with an alternative embodiment of the present invention.

FIG. 2 depicts the steps of an alternative method of assigning data to a vendor. The procedure of FIG. 2 starts in step 202, and proceeds to step 104 where a set of standard reports to monitor vendor management is created. Next in step 204, files are manually triggered in the workflow. Subsequently, the frequency of referral by a client is then determined in step 108, next the file type is determined in step 110, and the frequency of referral to a specific vendor is determined in step 112.

A vendor is then chosen manually in step 206, the allocation method may be based on a specific internal system, or may be done arbitrarily by the client. Next, files are allocated to the vendors in step 116, the workflow pattern to assign a vendor to an account is then updated in step 118, and in step 120 referral files containing all the necessary referred files are then sent via an online platform to the vendor.

Each vendor may require a specially formatted report regarding the collection of files allocated to the vendor, thus a determination if a vendor requires a formatted report is carried out next in step 122. If the vendor requires a formatted report the formatted report is sent in step 124, if the vendor does not require a formatted report step 124 is skipped and an unformatted report is sent to the vendor in step 126. Finally, the account information is updated in step 128 and the procedure ends in step 208.

Figure 3:
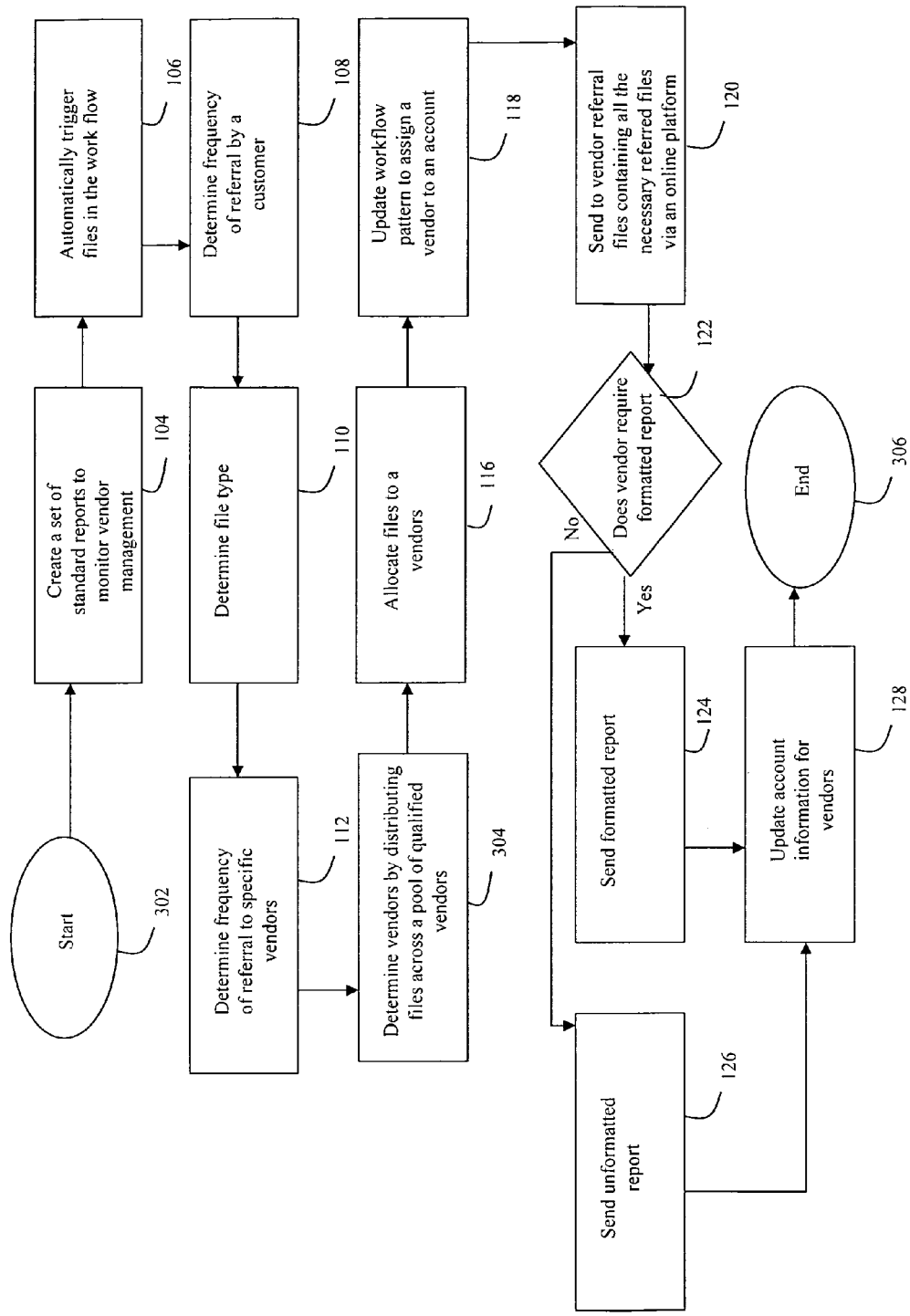
FIG. 3 is a flow chart depicting the steps taken when assigning data to a vendor in accordance with yet another alternative embodiment of the present invention.

FIG. 3 depicts the steps of yet another alternative method of assigning data to a vendor. The procedure of FIG. 3 starts in step 302, and proceeds to step 104 where a set of standard reports to monitor vendor management is created. Next files are automatically triggered in the workflow in step 106. Subsequently, the frequency of referral by a client is then determined in step 108, next the file type is determined in step 110, and the frequency of referral to a specific vendor is determined in step 112.

A vendor is then determined manually by distributing files across a pool of qualified vendors in step 304. Next, files are allocated to the vendors in step 116, the workflow pattern to assign a vendor to an account is then updated in step 118, and referral files containing all the necessary referred files are then sent via an online platform to the vendor in step 120.

Each vendor may require a specially formatted report regarding the collection of files allocated to the vendor, thus a determination if a vendor requires a formatted report is carried out next in step 122. If the vendor requires a formatted report the formatted report is sent in step 124, if the vendor does not require a formatted report step 124 is skipped and an unformatted report is sent to the vendor in step 126. Finally, the account information is updated in step 128 and the procedure ends in step 306.

After the initial referral is made, the system notifies the vendor and provides the vendor with any changes to the account. For example, if a financial balance of a referred account changes after initial referral (e.g. an additional loss payment is made), the vendor will be notified of such financial change.

The client may choose to withdraw one or more referral accounts from a particular vendor and reassign them to another eligible vendor, as necessary. The client may manually choose which vendor to reassign the file to from a list of eligible vendors or it may allow the system to automatically reassign the file to another eligible vendor via round robin logic, data mining, predictive modeling, etc. In the former situation, the system will automatically refer future related files to the newly chosen eligible vendor. Further, when the client chooses to reassign the file, it will be given the option to remove a particular vendor from the eligible list of vendors such that no files or fewer files are referred to that vendor in the future.

Additionally, the system of the present invention may provide an integrated online platform which allows access to information regarding the client (e.g. insurer), the vendor (e.g. attorney), and the adverse party (e.g. automobile manufacturer) in a claim. The online platform which enables the vendor and client, may limit access to files to access to predetermined portions of referred files. The system may allow the vendor to make a determination of whether to accept or reject a referred file. For example, an insurance provider (i.e. the client) has learned that a car accident for which the client is liable was caused by a faulty car part which is on recall by the automobile manufacturer (i.e. the adverse party).

In the above scenario, the client may choose to refer this claim to an attorney, the attorney may then seek compensation for the insurance provider from the automobile manufacturer for the damage resultant from the car accident and faulty part on recall. Likewise, in this example a single integrated online platform may be used to allow for transfer of documents, contacts, exchange of information, and general access to the files and materials involved in the claims to all the parties involved. Thus, in the above example the insurance provider (i.e. the client), the attorney (i.e. the vendor), and the automobile manufacturer (i.e. the adverse party) all have access to the claim and all related materials available via the integrated online platform.

In an alternative embodiment, only predetermined portions (e.g. police report, official claim, etc) may be available for the access of the adverse party while all materials may be available to the vendor and the client. In another embodiment, the client may impose controls over access to predetermined portions of materials available to the vendor and the adverse party via the online platform. Alternatively, controls over access to predetermined portions of different materials as well as which materials are accessible to any other party may be imposed by the vendor without departing from the spirit of the present invention.

Additionally, the system may have a user interface which allows for easy navigation and retrieval of files or any other materials available through the system of the present invention. The user interface may also be used to allow the vendor to accept or reject referred files. Alternatively, the vendor may use preprogrammed computer code to accept or reject referred files automatically based on predetermined parameters (i.e., the refereeing client, probability of success in file, income size from handling the file, etc,).

It will be apparent to those of skill in the art that numerous changes may be made in such details without departing from the spirit and the principles of the present invention. It should be appreciated that the present invention is capable of being embodied in other forms without departing from its essential characteristics.

The system may also perform data mining and other methods of determining whether certain files are related and thus should be referred to the same vendor. As before, the client may manually override this automated process and refer any file it chooses to a certain select vendor.

The system of the present invention may also collect all referrals in an extract file, which is provided to the vendor. The type of referred account is identifiable for the vendor in the extract file. Thus, the vendor is able to immediately access and review the file to determine whether or not to accept the account. The system retains the extract files for retrieval for a period of time. It is contemplated that the extract files will be saved for a predetermined period of time (e.g. at least thirty days), although this period may be adjusted as deemed necessary. In one embodiment, the system does not purge the file until after the vendor has downloaded it. In an alternative embodiment the file may be purged after a predetermined period of time. The frequency of this batch process is preferably at an interval determined by the client. For example, the client may elect different frequencies based on file type.

It is likely that larger vendors will download the export file to their own internal system for processing. For example, subrogation vendors will likely download the export file into their own claim systems. The present invention provides smaller vendors (e.g. attorneys) a report format for this information since they are not likely to load it into their own internal systems.

Furthermore, the present invention also allows the client to pull files back from one vendor and reassign them to another eligible vendor. The reassignment process allows for a single file, a group of selected files, or all files for a particular vendor to be reassigned. In order to properly determine which vendors are suitable for handling specific accounts the vendors' performance is periodically monitored. Additionally, the vendors' performance may be scored and analyzed based on a variety of methods.

In one embodiment, the system of the present invention may house the data needed to generate a report relating to the activities and specialization of a specific vendor without necessarily generating such a report. Likewise, the system of the present invention may store data needed to generate a report relating to the settlement, outcome and vendor assignment for a claim without generating such a report.

In an alternative embodiment, the reports described above may be maintained and generated by the system of the present invention. In yet another alternative embodiment a report may be generated for either the vendor management or claim settlement but not both.

The present invention may also provide reports regarding vendor performance or file handling. In one embodiment, standard reports are provided, including balancing reports based on daily activity in order to monitor any transactions. These reports may include one or more of the following sets of information: number of accounts assigned, number of accounts rejected, number of accounts reassigned, number of accounts outstanding or open, number of accounts closed or returned after a certain period with money recovered, number of accounts closed or returned after a certain period without money recovered, placement money, percentage placement (based on money), recovered money, percentage recovered (based on money), total number of closed accounts for a certain period, outstanding money, percentage outstanding (based on money), and average cycle time (total days of closed accounts divided by total number of closed accounts). Preferably, calculations regarding closed accounts exclude rejected accounts, but include both closed accounts and accounts returned after the specified period.

According to one embodiment of the present invention, the system described herein utilizes scoring of vendors in order to determine which vendors are best capable of handling certain types of claims. Additionally, in one embodiment, the present invention may implement a scoring process in order to identify which claims or files have the highest potential for being settled in a manner favorable to the client.

For example, a higher score for a claim may indicate that the claim is more likely to be resolved in a manner favorable to the client (i.e. the party that transfers the claim to the vendor for handling), conversely a lower score may indicate that the claim is likely to be resolved in a manner favorable to the adverse party. Alternatively, a lower score for a claim may indicate that the claim is more likely to be resolved in a manner favorable to the client, where as a higher score may indicate that the claim is likely to be resolved in a manner favorable to the adverse party.

Although linear scoring systems have been described above, any other method which identifies the likelihood of a given claim being settled in a favorable or adverse manner may be used without departing from the spirit of the present invention. The scoring systems described above may be used as alternatives or in conjunction with each other. For example, a linear system of scoring may be used for identifying the likelihood of a favorable outcome of a given claim, while a four-tiered percentage system (e.g. top performing 25% of vendors, worse performing 25% of vendors, etc,) may also be used. Conversely, an identical system may be used to score both the vendor performance and the likelihood of a favorable outcome in claim settlement for the client.

Figure 4:
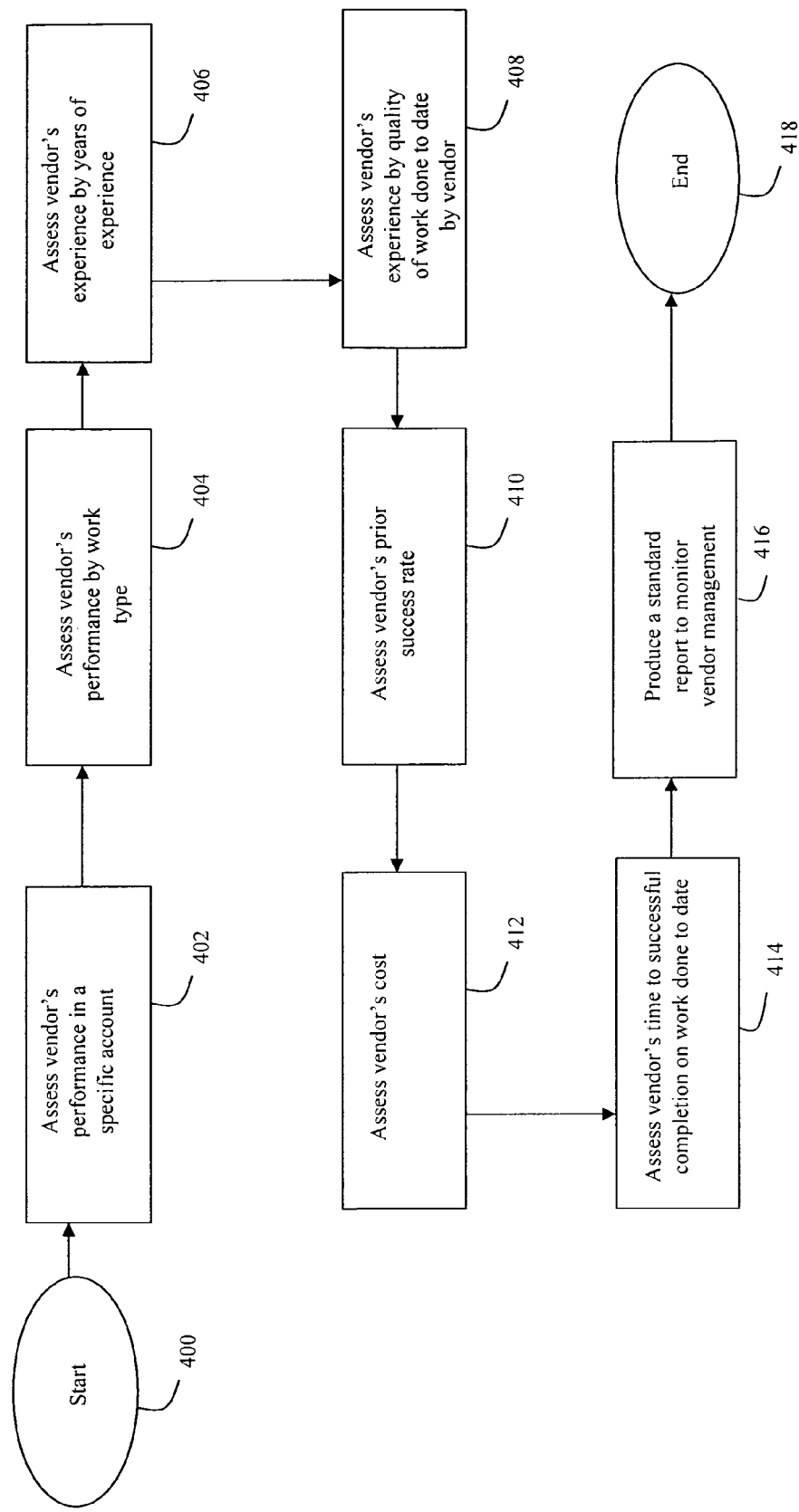
FIG. 4 is a flow chart depicting the steps taken during periodic account monitoring of vendor management in accordance with an embodiment of the present invention.

FIG. 4 depicts the method by which the present invention periodically monitors vendor performance and management in accordance with an embodiment of the present invention. The procedure starts in step 400, and proceeds to step 402 where the vendor's performance is assessed for a specific account. Next the vendor's performance is assessed by type of work in step 404, subsequently the vendor's experience is assessed by years of experience in step 406.

The vendor's experience is then assessed by quality of work done to date by the vendor in step 408, next the vendor's prior success rate is assessed in step 410. Afterwards, the vendor's cost is assessed in step 412, then the vendor's time to successful completion on work done to date is assessed in step 414, finally a standard report monitoring vendor management is produced in step 416, and the procedure ends in step 418.

As described above, the present invention may additionally include a bench marking system and method for vendor management. This aspect of the present invention may preferably determine each vendor's capacity and capability to handle and process specific files.

This may include determining each vendor's performance in a specific account, the vendor's performance within a work type category (e.g. attorney work, debt collection, etc), the vendor's experience assessed by years of experience, the vendor's experience assessed by work done by vendor to date, the vendor's prior success rate, the vendor's cost, the vendor's time to successful completion, and any other factor which may be deemed useful in assessing the performance of a vendor.

The factors above may generally be used with the scoring system. This is done in order for the client to be able to identify vendors suited for particular types of work more than other vendors. Alternatively, methods other than scoring a vendor may incorporate the abovementioned factors in order to determine which vendor should be assigned a specific file.

It is important to note that, the above listing of factors used to assess vendor performance is present for illustrative purposes, it is not meant to be an exhaustive enumeration of all of the possible factors by which a vendor's performance may be assessed. Any factors which are deemed useful by the client in determining vendor performance may be used in conjunction with the present invention to determine the performance of a vendor without departing from the spirit of the present invention.

The present invention, absent any indication otherwise by the relevant client refers related accounts to the same vendor regardless of whether the referrals occur on the same day or different days. In the preferred embodiment, the system checks certain criteria to determine whether the currently referred account is related to previously referred accounts. For example, the system may check a key claim number when referring each account. If another account with the same key claim number has already been referred, the subsequent account is preferably referred to the same vendor.

The present invention preferably notifies the vendor if there is a change in the referred account after initial referral (e.g. a change in the financial balance). In the preferred embodiment, the system enables the vendor to access and review the adjustment files as it deems necessary for processing and handling.

The system enables vendors to log-in at a website and view all information included in the extract file for accounts which have been referred to them. In one embodiment the vendor or adverse party may have access to the system via a secure private network. In the insurance example, this information may include, but is not limited to, the claim number, debtor information, insured information, balance, loss information, notes, contacts, carrier information, and other specific details. The system further allows the vendor to see all the necessary details of a single account and/or all the details for all accounts within a given download file.

Vendors may be given access to and/or automatically receive copies of documents and reports that are available for the files that have been referred to them, thereby reducing the time between initial referral and beginning file review. That is, the system may enable vendors to electronically receive a file containing all documents related to accounts that have been referred to them (e.g. via the provided online platform of the present invention).

If a vendor rejects a claim, the file is automatically re-queued and allocated to another vendor in the same vendor category. A check is built into the system to ensure that the file is not reassigned to a vendor that previously rejected it. If a file is rejected by all eligible vendors, the file is preferably automatically closed and a closing reason may be noted. Upon rejection, the rejecting vendor is no longer able to view the file details. For the above described reasons and due to other factors not mentioned here each client account is periodically monitored.

Figure 5:
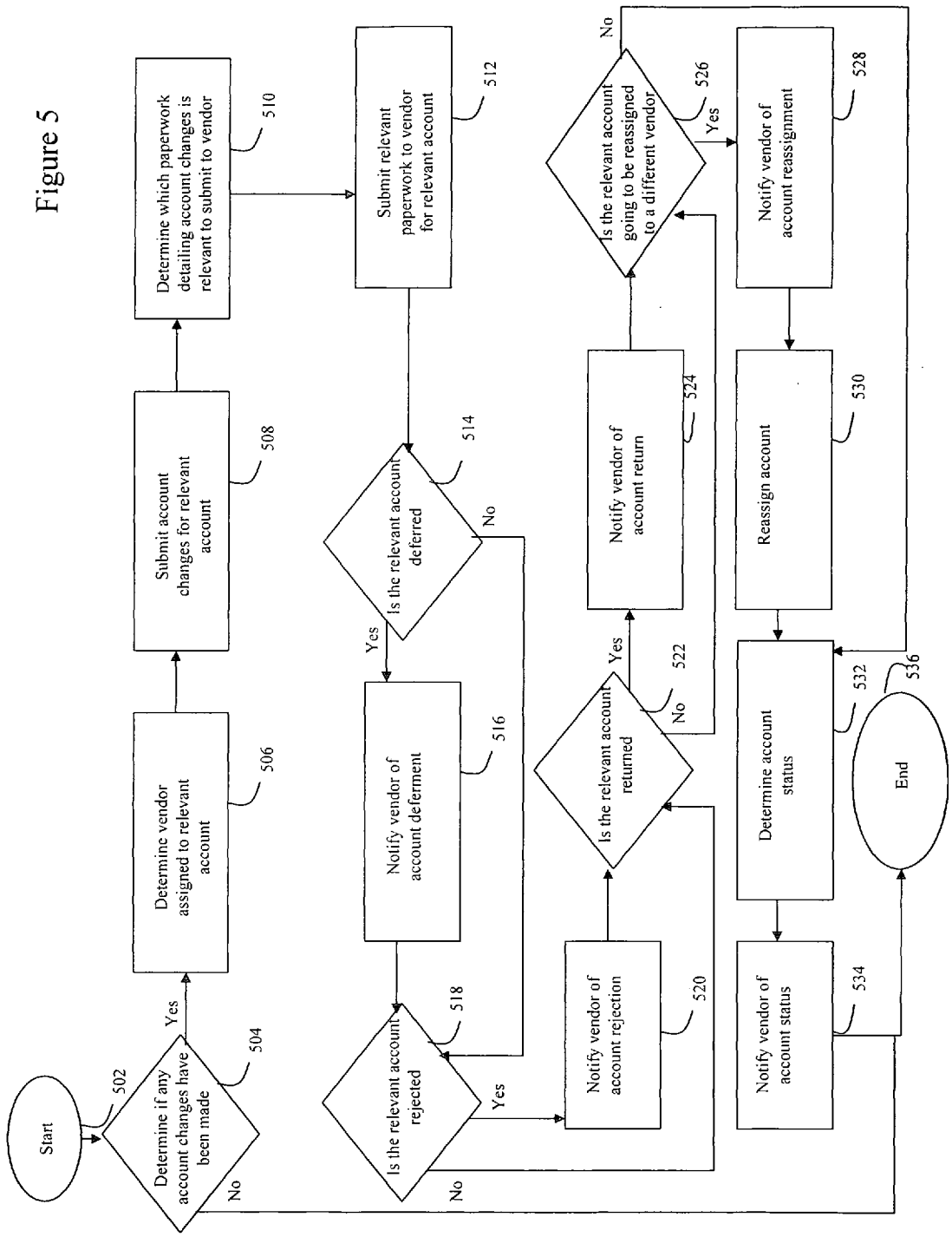
FIG. 5 is a flow chart depicting the steps taken when periodically updating a client account in accordance with an embodiment of the present invention.

FIG. 5 depicts the steps taken during the procedure of periodically updating and monitoring a client account in accordance with an embodiment of the present invention. The procedure starts in step 502, and proceeds to step 504 where it is determined if any account changes have been made. If it is determined that no changes have been made to the relevant account the procedure ends in step 536. If however it is determined that account changes have been made, it is determined which vendor is assigned to the relevant account in step 506, next account changes for the relevant account are submitted to the vendor in step 508, then it is determined which paperwork detailing account changes is relevant to submit to the vendor in step 510.

The relevant paperwork is submitted to the vendor in step 512, next it is determined if the relevant account is deferred in step 514, if the relevant account is deferred the vendor is notified of account deferment in step 516. If it is determined that the relevant account is not deferred step 516 is skipped and step 518 is performed. Subsequently, it is determined if the relevant account is rejected in step 518, if the account is rejected the vendor is notified of account rejection in step 520, if the account is not rejected step 520 is skipped and step 522 is performed.

It is determined if the account is returned in step 522, if the account is returned the vendor is notified of account return in step 524, if the account is not returned step 524 is skipped and step 526 is performed. Next, it is determined if the relevant account is to be reassigned in step 526, if the relevant account is not to be reassigned, steps 528 and 530 are skipped and the account status is determined in step 532.

However, if the account is to be reassigned the vendor is notified of the account reassignment in step 528 and the account is reassigned in step 530. Next, the account status is determined in step 532 and the vendor is then notified of the account status in step 534, the procedure then ends in step 536.

In one embodiment, the present invention also enables the vendor to submit a closing recommendation, including the underlying reasoning for such a recommendation. Each account receives an action which alerts the handler that the vendor recommends closing. The handler will then review the account and determine whether or not to close the account based on the vendor's recommendation. This review process may also be automated.

When a file is successfully referred to the vendor, a strategy is assigned within the system. This strategy is preferably determined by the client and is unique to the client based on the type of referral. Alternatively, the system may automatically assign a strategy based on, inter alia, the action code, referral type, data mining, or predictive modeling. There are several methods by which a given account may be rejected by one vendor and reassigned to another in accordance with the methods described herein, without departing from the spirit of the present invention. Thus, the methods in accordance with several embodiments of the present invention used when reassigning a vendor to a specific account are described below with respect to the relevant figures.

Figure 6:
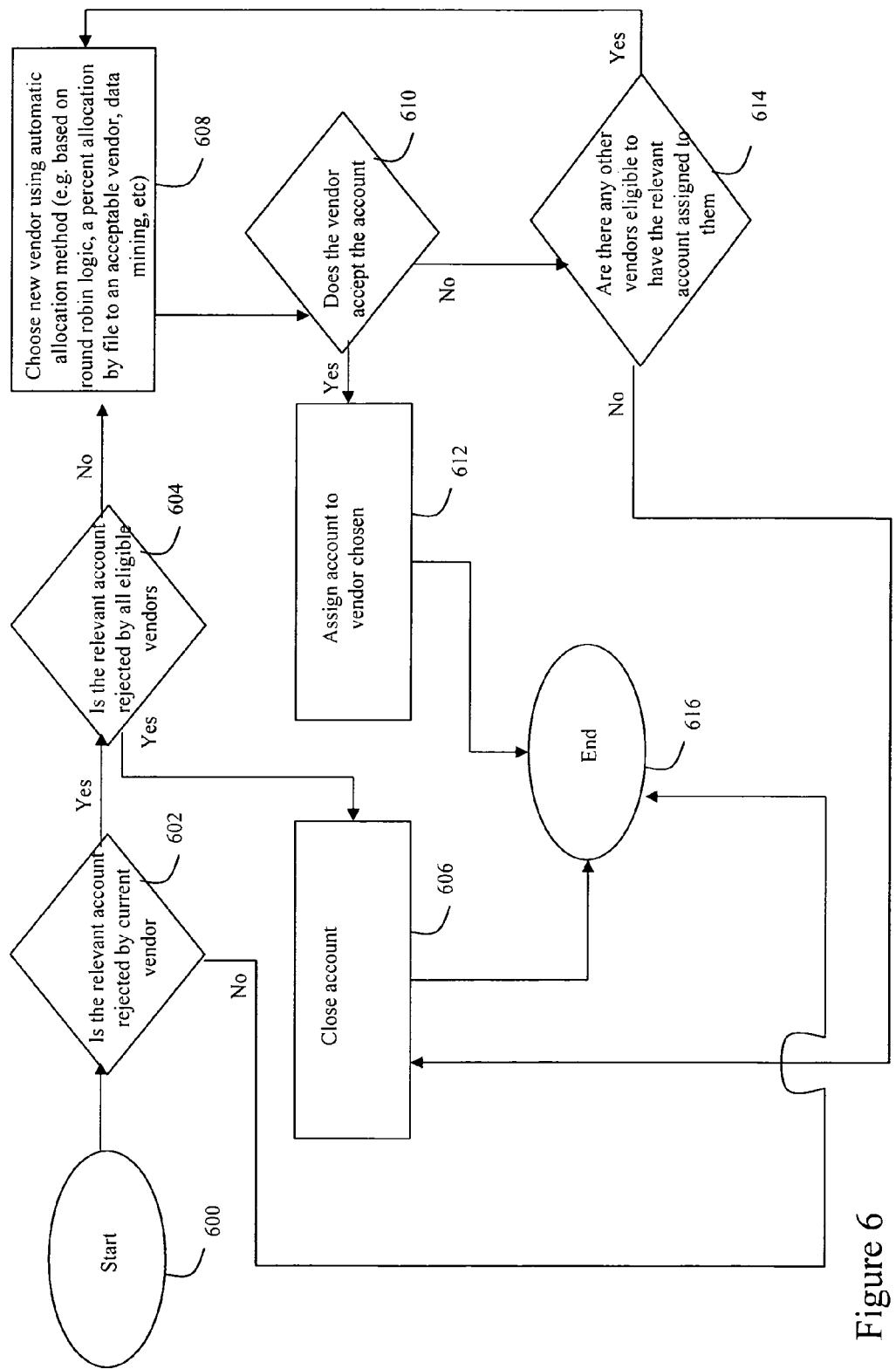
FIG. 6 is a flow chart depicting the steps taken when periodically managing and adjusting the vendor for a given account in accordance with an embodiment of the present invention.

FIG. 6 depicts the steps taken when periodically managing and adjusting the vendor for a given account in accordance with an embodiment of the present invention. The procedure in FIG. 6 starts in step 600, and proceeds to step 602 where it is determined if the relevant account is rejected by the current vendor. If the relevant account is not rejected, the procedure ends in step 616. If the relevant account is rejected by the current vendor it is determined if the account is rejected by all eligible vendors in step 604, if the account is rejected by all eligible vendors the account is closed in step 606 and the procedure ends in step 616.

If the account is not rejected by all eligible vendors a new vendor is chosen using the automatic allocation method in step 608, the allocation method can be any automatic method known in the art (e.g. based on round robin logic, a percent allocation by file to an acceptable vendor, data mining, etc,).

Next it is determined if the vendor accepts the account in step 610, if the vendor accepts the account, the account is assigned to the chosen vendor in step 612 and the procedure ends in step 616. If the vendor does not accept the account, it is determined if there are any other vendors eligible to have the relevant account assigned to them in step 614. If there are not other vendors eligible to have the relevant account assigned to them the account is closed in step 606 and the procedure ends in step 616.

If there are any other vendors eligible to have the relevant account assigned to them, steps 608 and 610 are repeated until either a vendor is chosen or the account is closed. The procedure ends in step 616.

Figure 7:
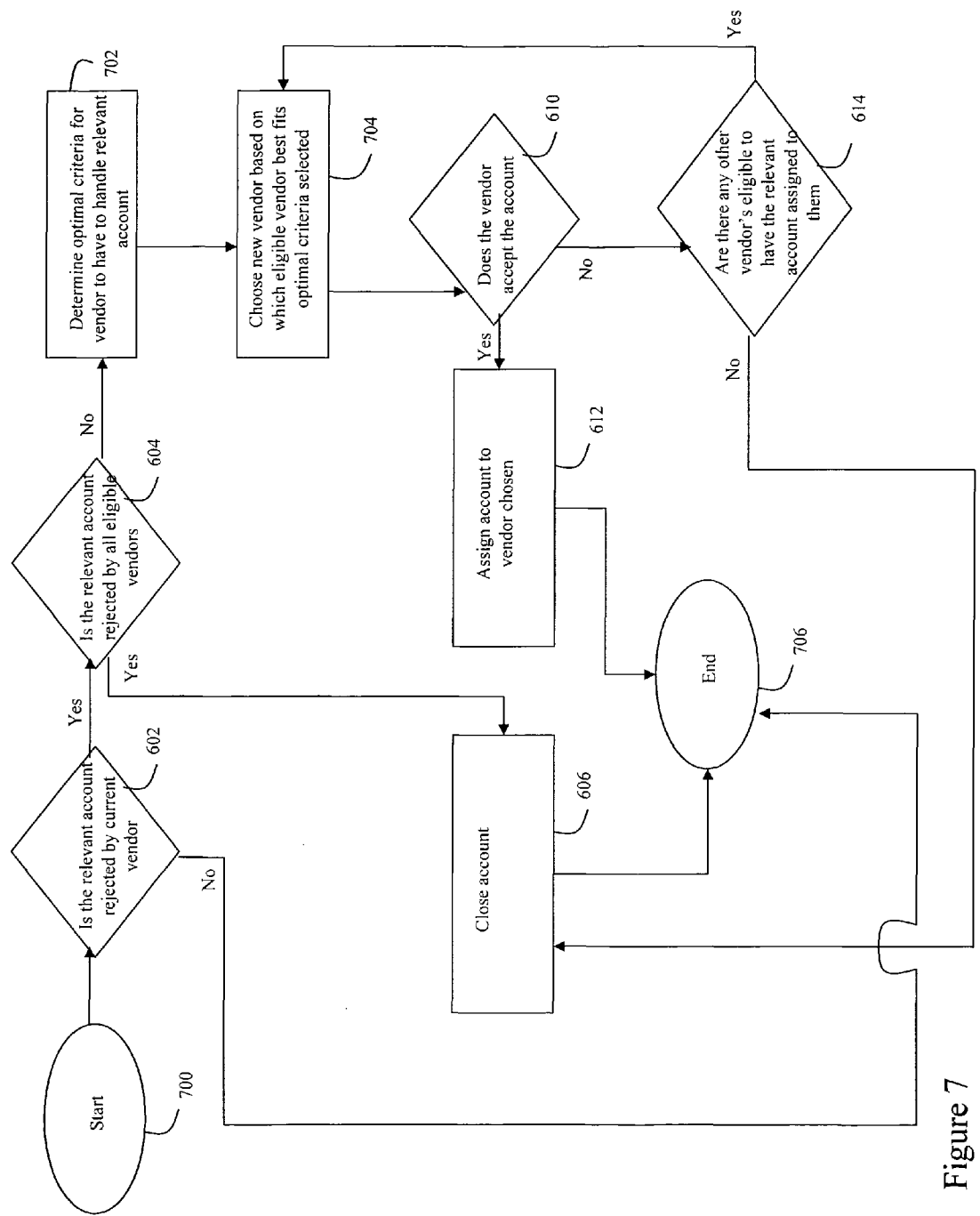
FIG. 7 is a flow chart depicting the steps taken when periodically managing and adjusting the vendor for a given account in accordance with an alternative embodiment of the present invention.

FIG. 7 depicts the steps taken when periodically managing and adjusting the vendor for a given account in accordance with an alternative embodiment of the present invention. The procedure in FIG. 7 starts in step 700, and proceeds to step 602 where it is determined if the relevant account is rejected by the current vendor. If the relevant account is not rejected the procedure ends in step 706. If the account is rejected by the current vendor it is determined if the account is rejected by all eligible vendors in step 604, if the account is rejected by all eligible vendors the account is closed in step 606 and the procedure ends, in step 706.

If the account is not rejected by all eligible vendors the optimal criteria for a vendor to have in order to handle the relevant account is determined in step 702, and a new vendor is chosen based on which eligible vendor best fits the optimal criteria selected in step 704

Next it is determined if the vendor accepts the account in step 610, if the vendor accepts the account, the account is assigned to the chosen vendor in step 612 and the procedure ends in step 706. If the vendor does not accept the account, it is determined if there are any other vendors eligible to have the relevant account assigned to them in step 614. If there are no other vendors eligible to have the relevant account assigned to them the account is closed in step 606 and the procedure ends in step 706.

If there are other vendors eligible to have the relevant account assigned to them, steps 704 and 610 are repeated until either a vendor is chosen or the account is closed. The procedure ends in step 706.

Figure 8:
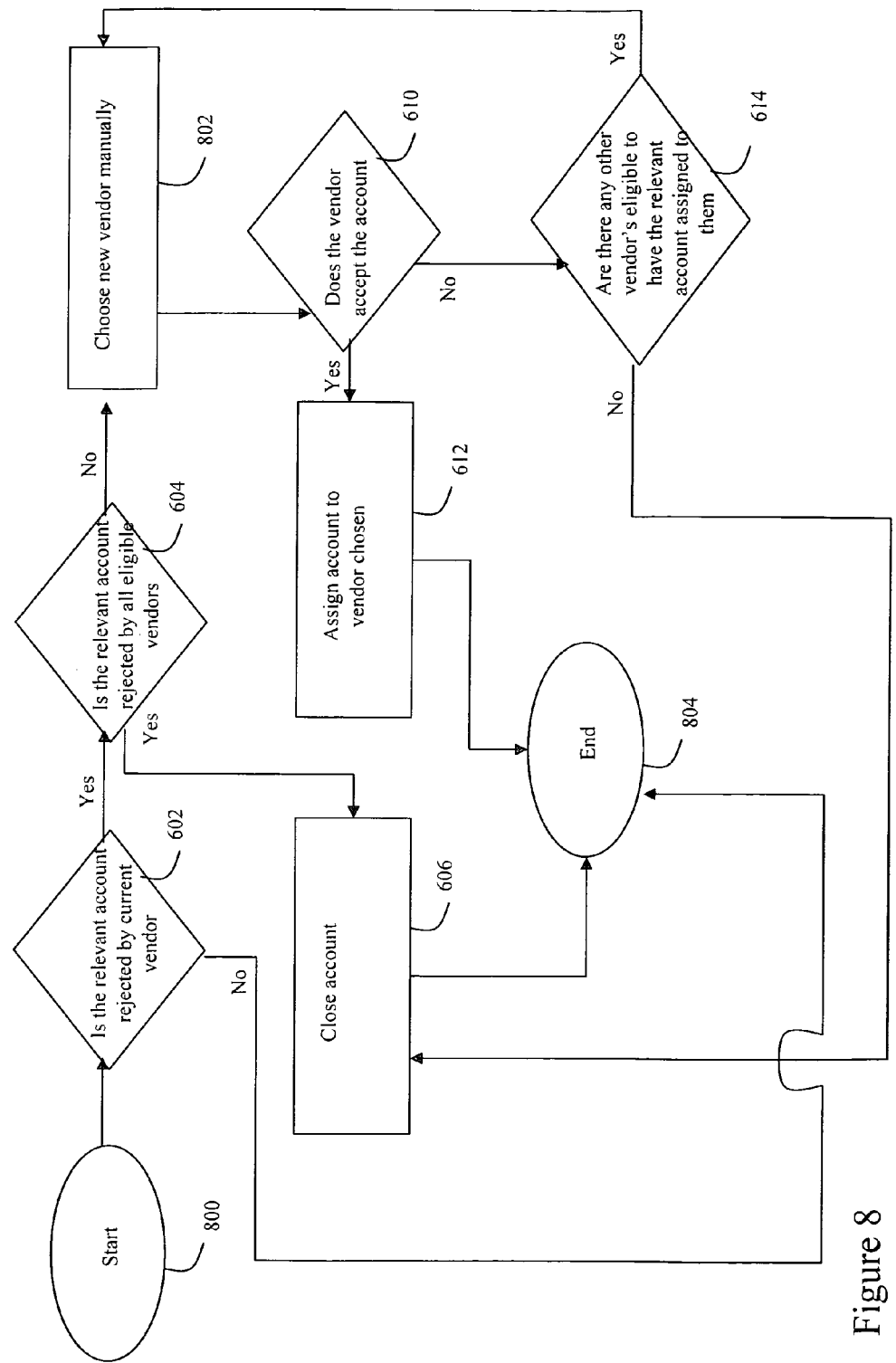
FIG. 8 is a flow chart depicting the steps taken when periodically managing and adjusting the vendor for a given account in accordance with yet another embodiment of the present invention.

FIG. 8 depicts the steps taken when periodically managing and adjusting the vendor for a given account in accordance with yet another alternative embodiment of the present invention. The procedure in FIG. 8 starts in step 800, and proceeds to step 602 where it is determined if the relevant account is rejected by the current vendor. If the relevant account is not rejected the procedure ends in step 804. If the account is rejected by the current vendor it is determined if the account is rejected by all eligible vendors in step 604, if the account is rejected by all eligible vendors the account is closed in step

606 and the procedure ends in step 804. If the account is not rejected by all eligible vendors a new vendor is chosen manually in step 802.

Next it is determined if the vendor accepts the account in step 610, if the vendor accepts the account, the account is assigned to the chosen vendor in step 612 and the procedure ends in step 804. If the vendor does not accept the account, it is determined if there are any other vendors eligible to have the relevant account assigned to them in step 614. If there are no other vendors eligible to have the relevant account assigned to them the account is closed in step 606 and the procedure ends in step 804.

If there are other vendors eligible to have the relevant account assigned to them, steps 802 and 610 are repeated until either a vendor is chosen or the account is closed. The procedure ends in step 804.

In accordance with the preferred embodiment of the present invention, the vendor can send actions (e.g. notes) to the system for loading to the account. These notes may be universal and thus used by all vendors for all clients. Advantageously, this benefits all clients and vendors by enabling them, inter alia, to avoid duplicative work, learn from each other, and further increase efficiency in processing and handling files. The ability to view certain notes can be limited to select vendors and/or select clients, as desired. Furthermore, these notes may be provided to the client to update the account. The actions may be limited by the client. In this scenario, the client configures a limited number of standard actions.

An action code or strategy is preferably inserted at a determined interval of time to alert the client that the assigned vendor has not yet successfully closed the file or established a payment plan. This may be accomplished via, among other things, a polling routine.

Vendors can close the file once they complete the necessary tasks. This closure is then communicated to the client via a file feed or through an interface. The file is noted as to the reason for closure. When the account is closed, the referral type for that particular file is found. Each referral type has an associated fee percentage, which will be multiplied by the collected amount to determine the fee amount.

A detailed billing report is preferably compiled based on all closed files in a given period. This report may comprise various information about the account, including, but not limited to, the claim number, the amount collected, the fee, and the net subrogation amount.

Preferably, if a first placement strategy is unsuccessful (e.g. no payment after a certain period) and the file remains open, the strategy preferably is allowed to automatically progress to a second placement strategy and vendor. If the second placement vendor is unsuccessful, the file is preferably automatically closed.

It is contemplated that there may be a business need to reassign a block of files from one vendor to another (e.g. due to poor performance, change in contract, etc). In this scenario, the client is able to select some or all of the accounts referred to a particular vendor and refer them to another vendor of its choice.

In one embodiment of the present invention, the client (e.g. automobile client) may identify a group amongst a plurality of files that are likely to have a favorable outcome to the client but require specific processing (e.g. auto insurance claim where the liable party does not have insurance but is considered likely to pay) by a specialized vendor (e.g. debt collector, attorney, subrogation specialist, etc). The client may then transfer the selected group of claims to a vendor (e.g. debt collection specialist) which requires processing and management.

Next, the client may determine which information is relevant to each file (e.g. type of car accident, makes of cars involved, models and years of cars involved, location of car accident, etc.) in order to determine the likely outcome of the file settlement. In one embodiment, the client may score the files based on the aforementioned information relevant to each file in order to determine which files are more likely to be settled with an outcome favorable to the client.

In an alternative embodiment, the client may determine based on internal standards which files are likely to be settled an outcome favorable to the client, without departing from the spirit of the present invention. Next, the client may decide which files are to be pursued aggressively, which are to be pursued less aggressively, and which abandoned, and allocate the files accordingly to the vendors which are the most likely to yield a favorable outcome to the client based on scoring or any other relevant information.

Subsequently, the client may transfer the claim information and all relevant materials to the vendor for processing and handling, the client may determine which vendor is likely to yield the most favorable outcome in a given file, the client may also determine how to distribute the files based on the cost of each vendor. Alternatively, the client may use any or all of the aforementioned factors, as well as any other factors the client deems fit to determine which vendor will handle each file.

Furthermore, a vendor may provide the client with a lower rate on referred files for a preferred returning client, a large amount of files allocated, or any other factor the vendor sees fit, without departing from the spirit of the present invention. Additionally, those claims whose outcome is determined to have a high probability of being unfavorable to the client, may be sent to a low cost vendor. In an alternative embodiment, such claims may not be pursued at all.

In the preferred embodiment, the above described steps will be implemented via an integrated online platform. However, the vendor, client, and/or adverse party may choose to send all materials via standard means (e.g. mail, physical delivery, etc), this may be done without departing from the spirit of the present invention.

It will be apparent to those of skill in the art that numerous changes may be made in such details without departing from the spirit and the principles of the invention. It should be appreciated that the present invention is capable of being embodied in other forms without departing from its essential characteristics.

The system of the present invention enables multiple clients to refer a variety of files to a select group of vendors having expertise in a particular line of business or process. The present invention preferably provides clients with a network of such vendors that would not normally be available to the clients without a considerable amount of time and research to find such expert vendors. Furthermore, the present invention provides a robust and flexible platform to support diverse referrals and workflow needs. The present invention also creates a set of standard reports that monitor the vendor management process.

The present invention preferably automatically triggers files at a certain point/action in a strategy workflow. The present invention also enables a client to manually trigger files by inserting an action on an account. Triggered files are preferably automatically allocated across a pool of qualified vendors. The present invention preferably determines frequency of referrals by the client, the file type, or both.

The present invention may also provide vendors with the ability to immediately view pertinent information online for referred accounts, to access various documents related to the referral, and to accept, reject, and/or return a referred file. Furthermore, the present invention enables the clients and eligible vendors to communicate regarding a referred file. Preferably, an online platform is provided through which the vendors can submit correspondence regarding the referred, rejected, and/or returned accounts.

If an online platform is implemented as described above, the system will send the vendor a referral file containing all the necessary files (e.g. claim details) via the online platform. Larger vendors (e.g. subrogation vendors) typically export the necessary files to their internal systems. Smaller vendors (e.g. attorneys) typically will not. In the latter situation, the system of the present invention provides smaller vendors with a report format containing the necessary information to successfully process and handle the referral.

Files may be allocated, for example, based on round robin logic, a percent allocation by file type to each acceptable vendor, data mining, or predictive modeling (e.g. based on such factors as expertise in a given field, prior success rate, time for successful completion, etc.). Alternatively, the client may select a specific vendor to whom the file will be referred. In this scenario, the allocation process is bypassed. Once the file has been allocated to the vendor, the workflow platform is updated with that vendor as the external specialist for the account.

Advantageously, the present invention refers related accounts to the same vendor thereby further increasing the efficiency of the referral process. Referring related accounts to the same vendor is advantageous to both the client and the vendor. The Vendors who have previously accepted similar referrals may be more likely to accept future related referrals. Also, the vendor gains additional experience with each new referral thus increasing the likelihood of quick and successful performance to complete the necessary tasks related to the referrals. Furthermore, the client may manually override this option and choose a vendor to whom the files should be referred in the future.

It is possible that all eligible vendors have reviewed and rejected a referred file. In this case, the referred file is preferably automatically closed. Alternatively, the referred file may be held open for a certain period. The system of the present invention periodically checks to determine whether any new eligible vendors meeting the necessary criteria exist. If such new vendors exist, the file is referred to them for review.

Additionally, the present invention preferably alerts the client if a file has been referred for more than a certain period, but has not been closed. If a first placement vendor fails to close the referred file after a certain period, the file is automatically advanced in strategy and assigned to a second placement vendor.

The present invention also provides vendors with the option to submit a recommendation to close the file. The handler then preferably reviews the recommendation and determines whether or not to close the file. It is further contemplated that such a review may be automated.

When a vendor accepts a referred file, the system of present invention assigns the appropriate strategy and actions for that particular file type. After a vendor completes its work on a file, it has the ability to close the file. Closure of the file preferably automatically generates the calculation of a fee for services. The present invention may automatically compile a billing report for a specified period based on these fees.

Figure 9:
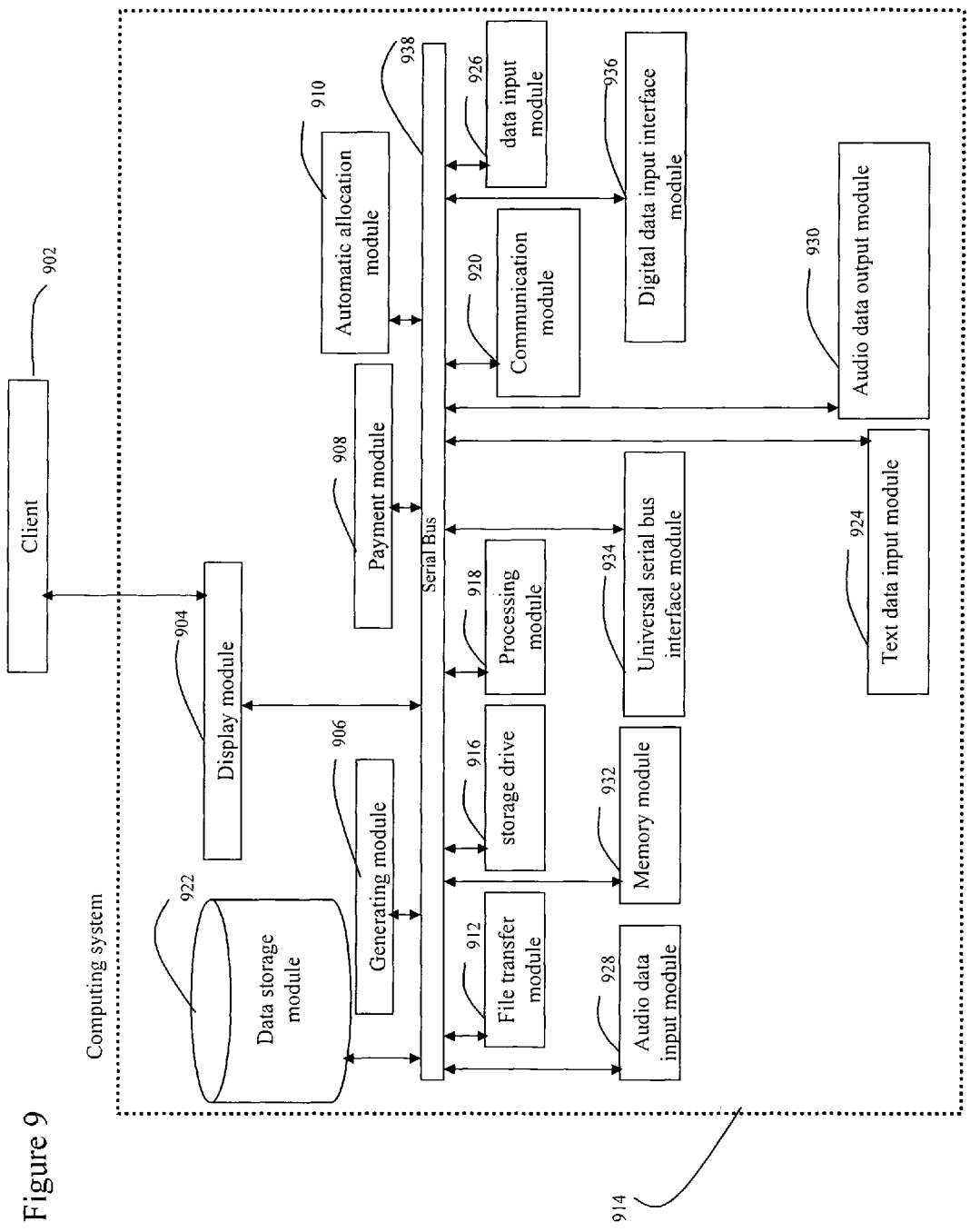
FIG. 9 is a diagram depicting the system on which the methods of the present invention may be implemented in accordance with an embodiment of the present invention.

FIG. 9 depicts a system on which the methods of the present invention may be implemented. The present invention relates to the field of vendor management, and specifically to a vendor assignment for claim handling product system, apparatus and method which includes at least one central processing computer or computer network server. Network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server. The network server may be configured in many different ways. For example, network server may be a conventional standalone server computer or alternatively, the function of server may be distributed across multiple computing systems and architectures.

The network server may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS.TM., ATP, Bluetooth, GSM and TCP/IP.

Data storage device may include a hard magnetic disk drive, optical storage units, CD-ROM drives, or flash memory. Data storage device contains databases used in processing transactions and/or calculations in accordance with the present invention, including at least one vendor management database and at least one file distribution database. In one embodiment, database software creates and manages these databases. In one embodiment calculations and/or algorithms of the present invention are stored in storage device and executed by the CPU.

The controller comprises a processor, such as one or more conventional microprocessors and one or more supplementary co-processors such as math co-processors. The processor is in communication with a communication port through which the processor communicates with other devices such as other servers, user terminals or devices. The communication port may include multiple communication channels for simultaneous communication with, for example, other processors, servers or client terminals. As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor also is in communication with a data storage device. The data storage device may comprise an appropriate combination of magnetic, optical and/or semiconductor memory, and may include, for example, RAM, ROM, flash drive, an optical disc such as a compact disc and/or a hard disk or drive. The processor and the data storage device each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wireline medium or combination of the foregoing.

The data storage device may store, for example, (i) a program (e.g., computer program code and/or a computer program product) adapted to direct the processor in accordance with the present invention, and particularly in accordance with the processes described in detail hereinafter with regard to the controller; (ii) a database adapted to store information that may be utilized to store information required by the program. The database includes multiple records, each record includes fields that are specific to the present invention such as the likely outcome of a settlement in a file, scores for vendors, adverse party contact information, client information etc.

The program may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention.

Thus, embodiments of the present invention are not limited to any specific combination of hardware and software. Suitable computer program code may be provided for performing numerous functions such as monitoring the performance of a vendor, allocating files to a vendor, determining which vendor's are to receive which files, etc. The functions described above are merely exemplary and should not be considered exhaustive of the type of function which may be performed by the computer program code of the present invention, as the system described herein is suitable for performing all of the functions necessary for the implementation of the present invention.

The computer program code required to implement the above functions (and the other functions described herein) can be developed by a person of ordinary skill in the art, and is not described in detail herein.

The computing system 914 would generally be used by a client 902 however the system may be operated by any individual or organization without departing from the spirit of the present invention. All of the modules described herein are operably inter-connected via a bi-directional connection with a central serial bus 938. The serial bus 938 serves to receive information from every single module, as well as to transmit information from one module to another. The computing system 914 includes a display module 904, and a generating module 906. The generating module 906 may be used for generating reports regarding a vendor's performance in a given claim, reports regarding the likely outcome of a claim or file processing, the likely response of the adverse party, and scores of claims and vendors.

The computing system 914 additionally includes a payment module 908 for making periodic payments to a vendor, a client of the client or adverse party and for receiving a payment from a vendor or an adverse party.

The system further comprises an automatic allocation module 910 for automatically determining which vendors are to receive which files. Furthermore, the system comprises a file transfer module 912 for transferring files to a vendor, transferring files to an adverse party, transferring files to the client, receiving files from a vendor, receiving files from an adverse party, and receiving files from the client.

Additionally, the computing system 914 includes: a storage drive 916 for receiving data stored on an optical disc, a processing module 918 for processing digital data received by and contained in the computing system 914, a communication module 920 for bi-directional communication with external and telecommunications systems, a data storage module 922 for storing and managing digital information, a text data input module 924 for inputting data in the form of text, and a data input module 926 for converting to digital format documents and images and inputting them into the computing system 914.

Finally, the computing system 914 includes: an audio data input module 928 for receiving and inputting audio information, an audio data output module 930 for outputting data in audio format (i.e. recorded speech, synthetically generated speech from digital text, etc), a memory module 932 for temporarily storing information as it is being processed by the processing module 918, a universal serial bus interface module 934 for receiving and transmitting data to and from devices capable of establishing a universal serial bus connection, and a digital data input interface module 936 for receiving data contained in digital storage devices (e.g. floppy disk, zip drive, 8 mm digital tape, etc).

The term computer-readable medium as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and device drivers that allow the processor to interface with computer peripheral devices (e.g. a video display, a keyboard, a computer mouse, etc.).

It is apparent from the above description that some notable key features of the present invention enable the client to securely and cost effectively assign various file types to certain vendors for further processing and handling, and provides a customized file referral layout.

Further notable key features of the present invention are assigning a particular vendor from a pool of vendors through the implementation of client set rules, enabling a vendor to access certain portions of a referred file/s via an integrated and online platform in order to make a determination of whether to accept or reject the referred file/s, and enabling the vendor to download files of accepted referrals to its own internal system where the files may be utilized within the vendor's preferred workflow.

Additionally, other notable key features of the present invention include the capabilities of notifying the client if the vendor rejects the file, reassigning rejected files to other vendors, enabling clients and vendors to communicate electronically, enabling clients and vendors to make updates to the referral file, enabling clients to automatically direct files to the appropriate pool of eligible vendors while maintaining control of the referred volume, and providing a system that manages a plurality of vendors through improved tracking of files and vendor performance.

Furthermore, other notable key features of the present invention include the capabilities of providing vendors immediate electronic access to referral data, providing vendors with a single point of contact for multiple clients enabling vendors to easily accept or reject files at their discretion, and enabling a client or vendor to process transactions one-by-one, in bulk, or in selected groups.

The key features of the present invention presented above are described for illustrative purposes only and do not serve to limit the scope of the invention to the specific features listed, nor do they represent an exhaustive enumeration of all aspects of the invention. Accordingly, well known methods, procedures, and substances for both carrying out the objectives of the present invention and illustrating the preferred embodiment are incorporated herein but have not been described in detail as not to unnecessarily obscure novel aspects of the present invention.

While the present invention has been described with reference to the key features, preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. Thus, the scope of the invention, shall be defined solely by the following claims.

Further, it will be apparent to those of skill in the art that numerous changes may be made in such details without departing from the spirit and the principles of the invention. It should be appreciated that the present invention is capable of being embodied in other forms without departing from its essential characteristics.

What is claimed:

1. A computer system for managing and distributing a plurality of files and data among a plurality of vendor computer systems and a plurality of client computer systems, said system comprising:
    a data storage device storing information associated with said plurality of files and said plurality of vendors;
    a computing system, in communication with said data storage device, said plurality of vendor computer systems, and said plurality of client computer systems, said computing system having a processor configured to transmit a set of files using a communication module from one of said client computer systems to a selected one of said vendor computer systems for processing by said selected vendor and to provide access to materials relevant to said transmitted files to both said one of said client computer systems and said vendor computer systems; and
    wherein the computing system is configured to (i) identify a plurality of acceptable vendors from said plurality of vendors, (ii) determine, for each one of the plurality of files, a likelihood of a desired outcome resultant from file processing by the identified acceptable vendors, employing a computerized predictive model, (iii) score said acceptable vendors to determine which one of said acceptable vendors is best qualified to receive each of said plurality of files, and (iv) select the one of the plurality of acceptable vendors determined to be best qualified for receiving each one of the plurality of files, the determining based on the information associated with the files, the determined likelihood of the desired outcome, and the information associated with the vendors; and
    wherein said vendors are attorneys and debt collectors, and said determination of likelihood of the desired outcome by the computerized predictive model is based on: data relating to at least one of the files and data relating to the vendors including: expertise of the vendors in the same field as the at least one file, vendors' performance by work type, vendors' performance on client files received by the vendors to date, prior success rate of the vendors, and time for successful completion by the vendors;
    wherein the computing system is further configured to, in a batch process, generate extract files containing file data, make the extract files available to the vendor computer systems for download and to permit download of extract files accessible in a report format, and purge the extract files after a predetermined period of time; and further, configured to determine, by executing instructions in vendor-controlled computer code, automatic vendor acceptance or rejection of the files; and
    wherein the computing system further comprises a non-transitory computer-readable medium having stored thereon processor-executable instructions, which instructions include a generating module which, when executed by a processor, cause the processor to generate at least one report describing which specific files should be transmitted to certain vendors best suited for processing of said specific files using said scoring of said vendors.

2. The system of claim 1, wherein said communication module is configured to transmit and receive files over a secure private network.

3. The system of claim 1, wherein the system further comprises a non-transitory computer-readable medium having stored thereon processor-executable instructions, which instructions include a generating module which, when executed by a processor, cause the processor to generate at least one report of specific vendors best suited for processing of certain types of files using said scoring of said vendors.

4. The system of claim 1 wherein said processor is further configured to score said plurality of files in order to determine which vendor is best qualified to receive each of said plurality of files.

5. The system of claim 1 wherein a specific vendor is selected from said vendors through the implementation of rules set by said client and implemented by said system automatically.

6. The system of claim 1 further comprising an online platform which enables said selected vendor and at least one of said clients to access predetermined portions of referred files, and to allow said selected vendor to make a determination of whether to accept or reject said referred files.

7. The system of claim 6 wherein said online platform is capable of: enabling said selected vendor to download files of accepted referrals to its own internal system where said files may be utilized within said selected vendor's preferred workflow, notifying said client if said selected vendor rejects said file, and enabling said client and said selected vendor to communicate via updates to said referred files.

8. The system of claim 6 wherein said online platform is capable of: reassigning files from one vendor to another vendor, allowing said clients to automatically direct specific files to a pool of eligible vendors while maintaining control of said referred files, monitoring a plurality of vendors through improved tracking of files and vendor performance, and providing said selected vendor immediate electronic access to referral data.

9. The system of claim 6 wherein said online platform is capable of: providing said vendors with a single point of contact for multiple clients, enabling said vendors to accept or reject files at their discretion via a user interface or a preprogrammed computer code, and enabling said at least one client or said vendors to process transactions one-by-one, in bulk, or in selected groups.

10. The system of claim 6, wherein the predetermined portions comprise at least police reports.

11. The system of claim 1, wherein the processor is further configured to automatically refer a file to a vendor responsive to a trigger associated with the file, wherein the triggers include action codes indicative of at least, second placement collection referral, vendor arbitration, and uninsured motorist vendor management referral.

12. The system of claim 1, wherein the processor is further configured to, responsive to all acceptable vendors rejecting a file, determine periodically whether a new acceptable vendor exists, and responsive to determining that a new acceptable vendor exists, refer the file to the new acceptable vendor.

13. The system of claim 1, wherein the processor is further configured to, responsive to determining that a file has a probability of an unfavorable outcome above a probability of an unfavorable outcome threshold, select a vendor having a cost below a cost threshold for the file.

14. The system of claim 1, wherein the processor is further configured to, responsive to no payment after a predetermined period after referral of a file to a vendor, automatically reassign the file to a second vendor.

15. The system of claim 1, wherein the processor is further configured to, responsive to determining that a file is for an auto insurance claim wherein the liable party does not have insurance but has a likelihood of payment above a threshold, to transfer the file to a debt collection specialist.

16. The system of claim 1, wherein the processor is further configured to implement a polling routine to determine, after a determined interval of time, whether the vendor assigned to a file has either closed the file or established a payment plan, and responsive to determining that the vendor has neither closed the file nor established the payment plan, alert a client computer system.

17. A computer implemented method for managing and distributing a plurality of files to a plurality of vendor computer systems from a plurality of client computer systems wherein the files comprise at least some materials related to each of the clients seeking compensation from at least one adverse party, the method comprising:
- identifying by one of the plurality of client computer systems a plurality of acceptable vendors from said plurality of vendors;
- determining by the client computer system, for each one of the plurality of files, a likelihood of a desired outcome resultant from file processing for each of the files by the identified acceptable vendors, employing a computerized predictive model;
- scoring, by the client computer system, the plurality of acceptable vendors to determine which one of said acceptable vendors is best qualified to receive each one of the plurality of files, and selecting, by the client computer system, the one of the plurality of acceptable vendors determined to be best qualified to receive each one of the plurality of files, the determining based on stored information associated with the plurality of files, the determined likelihood of a desired outcome, and stored information associated with the vendors; and
- transmitting a set of the files by the client computer system from the client to the selected vendor and providing access to materials relevant to said transmitted files to both said client and said vendor,
- wherein said vendors comprise attorneys and debt collectors, and the determining of likelihood of the desired outcome using the computerized predictive model is based on: data relating to the file and data relating to the vendors including: expertise of the vendors in the same field as the file, vendors' performance by work type, vendors' performance on client files received by vendors to date, prior success rate of the vendors, and time for successful completion by the vendors;
- wherein the computing system further, in a batch process, generates extract files containing file data, makes the extract files available to the vendor computer systems for download and permits download of extract files available in a report format, and purges the extract files after a predetermined period of time; and further determines, by executing instructions in vendor-controlled computer code, automatic vendor acceptance or rejection of the files; and
- wherein the computer system further generates at least one report describing which specific files should be transmitted to certain vendors best suited for processing of said specific files using said scoring of said vendors.

18. The computer implemented method of claim 17 wherein an online platform is available to the client-determined vendor, the client and the adverse party, the platform configured to enable the vendor and the client to access all materials of the file, and to enable the adverse party to access only predetermined portions of referred files, allow the adverse party to add file related materials to the available materials via the online platform, and to allow the vendor to make a determination of whether to accept or reject referred files.

19. The computer implemented method of claim 18 wherein the online platform is capable of the following: enabling the client-determined vendor, the at least one client, and the at least one adverse party to download files to their respective internal systems where the files may be utilized within the vendor's and the adverse party's respective workflows, notifying the client if the vendor rejects the file, and enabling the client, the adverse party and the vendor to communicate via updates to the referred file.

20. The computer implemented method of claim 18 wherein the online platform is capable of the following: reassigning files from one vendor to another vendor, allowing the client to automatically direct specific files to a pool of eligible vendors while maintaining control of the referred volume, monitoring a plurality of vendors through improved tracking of files and vendor performance, and providing the vendor, the adverse party and the client immediate electronic access to the referred file.

21. The computer implemented method of claim 18 wherein the online platform is capable of the following: providing the client-determined vendor and the at least one adverse party with a single point of contact for multiple clients, enabling the vendor to accept or reject files at their discretion via a user interface or a preprogrammed computer code, and enabling the at least one client, at least one adverse party and the vendor to process transactions one-by-one, in bulk, or in selected groups.

22. The computer-implemented method of claim 17, further comprising monitoring vendor performance using factors including: number of accounts closed or returned after a certain period with money recovered; number of accounts closed or returned after a certain period without money recovered and average cycle time.

* * * * *